(12) United States Patent
Hettiwatte

(10) Patent No.: US 11,675,580 B2
(45) Date of Patent: Jun. 13, 2023

(54) IMAGE-BASED OPERATING SYSTEM UPGRADE PROCESS

(71) Applicant: Virtustream IP Holding Company LLC, Bethesda, MD (US)

(72) Inventor: Niranjan Hettiwatte, Phoenix, AZ (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 49 days.

(21) Appl. No.: 17/218,987

(22) Filed: Mar. 31, 2021

(65) Prior Publication Data
US 2022/0317989 A1 Oct. 6, 2022

(51) Int. Cl.
- *G06F 9/44* (2018.01)
- *G06F 8/65* (2018.01)
- *G06F 11/36* (2006.01)
- *G06F 9/455* (2018.01)
- *G06F 9/445* (2018.01)

(52) U.S. Cl.
CPC ............ *G06F 8/65* (2013.01); *G06F 9/44505* (2013.01); *G06F 9/45558* (2013.01); *G06F 11/3668* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,351,850 B1* | 2/2002 | van Gilluwe | G06F 8/61 707/999.202 |
| 2008/0271017 A1* | 10/2008 | Herington | G06F 9/45558 718/1 |
| 2010/0257513 A1* | 10/2010 | Thirumalai | G06F 16/2365 717/134 |
| 2012/0291021 A1* | 11/2012 | Banerjee | G06F 9/45558 717/173 |

(Continued)

OTHER PUBLICATIONS

Red Hat Inc., "Migration Planning Guide," Red Hat Enterprise Linux 7, https://access.redhat.com/documentation/en-us/red_hat_enterprise_linux/7/html-single/migration_planning_guide/index, Accessed Mar. 31, 2021, 106 pages.

(Continued)

*Primary Examiner* — Wei Y Zhen
*Assistant Examiner* — Lanny N Ung
(74) *Attorney, Agent, or Firm* — Ryan, Mason & Lewis, LLP

(57) ABSTRACT

An apparatus comprises at least one processing device coupled to memory. The at least one processing device is configured to obtain an operating system image from a production server or other computing device and to implement a first operating system configuration on a non-production server, a test server or other type of server based at least in part on the operating system image. The at least one processing device is further configured to modify the first operating system configuration to generate a second operating system configuration on the server and to generate a modified operating system image-based at least in part on the second operating system configuration. The at least one processing device is further configured to provide the modified operating system image to the computing device.

20 Claims, 12 Drawing Sheets

(56) References Cited

U.S. PATENT DOCUMENTS

| | | | |
|---|---|---|---|
| 2014/0208091 A1* | 7/2014 | Koning | G06F 11/1433 713/2 |
| 2019/0339958 A1* | 11/2019 | Joshi | G06F 11/1417 |
| 2020/0026524 A1* | 1/2020 | Roland | G06F 3/0617 |
| 2020/0167094 A1* | 5/2020 | Sariel | G06F 3/0647 |
| 2021/0173767 A1* | 6/2021 | Zhang | G06F 11/3688 |

OTHER PUBLICATIONS

Red Hat Inc., "How do I upgrade from Red Hat Enterprise Linux 6 to Red Hat Enterprise Linux 7?" https://access.redhat.com/solutions/637583, Mar. 5, 2021, 2 pages.

Red Hat Inc., "What are the supported use cases for upgrading to Red Hat Enterprise Linux 7?" https://access.redhat.com/solutions/799813, Apr. 28, 2017, 2 pages.

Red Hat Inc., "Running a Red Hat Enterprise Linux 7 Virtual Machine on a VMware Host Using Open-vm-tools," https://access.redhat.com/articles/1282083, May 8, 2018, 2 pages.

Red Hat Inc., "Working with GRUB 2," Chapter 26, https://access.redhat.com/documentation/en-us/red_hat_enterprise_linux/7/html/system_administrators_guide/ch-working_with_the_grub_2_boot_loader#sec-Upgrading_from_GRUB_Legacy_to_GRUB_2, Accessed Mar. 31, 2021, 35 pages.

Red Hat Inc., "What is Relax and Recover(ReaR) and How Can I Use It for Disaster Recovery?" https://access.redhat.com/solutions/2115051, Jul. 30, 2019, 10 pages.

Microsoft, "Create a Virtual Machine from a Snapshot with PowerShell (Windows)" https://docs.microsoft.com/en-us/previous-versions/azure/virtual-machines/scripts/virtual-machines-windows-powershell-sample-create-vm-from-snapshot, May 10, 2017, 3 pages.

Microsoft, "Create a Snapshot Using the Portal or PowerShell," https://docs.microsoft.com/en-us/azure/virtual-machines/windows/snapshot-copy-managed-disk, Oct. 8, 2018, 3 pages.

VMware, Inc., "VMware Workstation 4," https://www.vmware.com/support/ws4/doc/preserve_snapshot_ws.html, Accessed Mar. 31, 2021, 5 pages.

* cited by examiner

IMAGE-BASED OPERATING SYSTEM UPGRADE PROCESS

FIELD

The field relates generally to information processing systems, and more particularly to operating system (OS) upgrades in information processing systems.

BACKGROUND

The process for upgrading an OS in a production server often involves significant downtime while an administrator administers the upgrade. Because of this upgrade downtime, end users may be inhibited from being able to access their data. In some cases, significant testing of the upgrade must also be performed on the production server before bringing the production server back online, which further increases the impact of the upgrade on the end user.

SUMMARY

In one embodiment, an apparatus comprises at least one processing device coupled to memory. The at least one processing device is configured to obtain an OS image from a production server or other computing device and to implement a first OS configuration on a non-production server, a test server or other type of server based at least in part on the OS image. The at least one processing device is further configured to modify the first OS configuration to generate a second OS configuration on the server and to generate a modified OS image-based at least in part on the second OS configuration. The at least one processing device is further configured to provide the modified OS image to the computing device.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
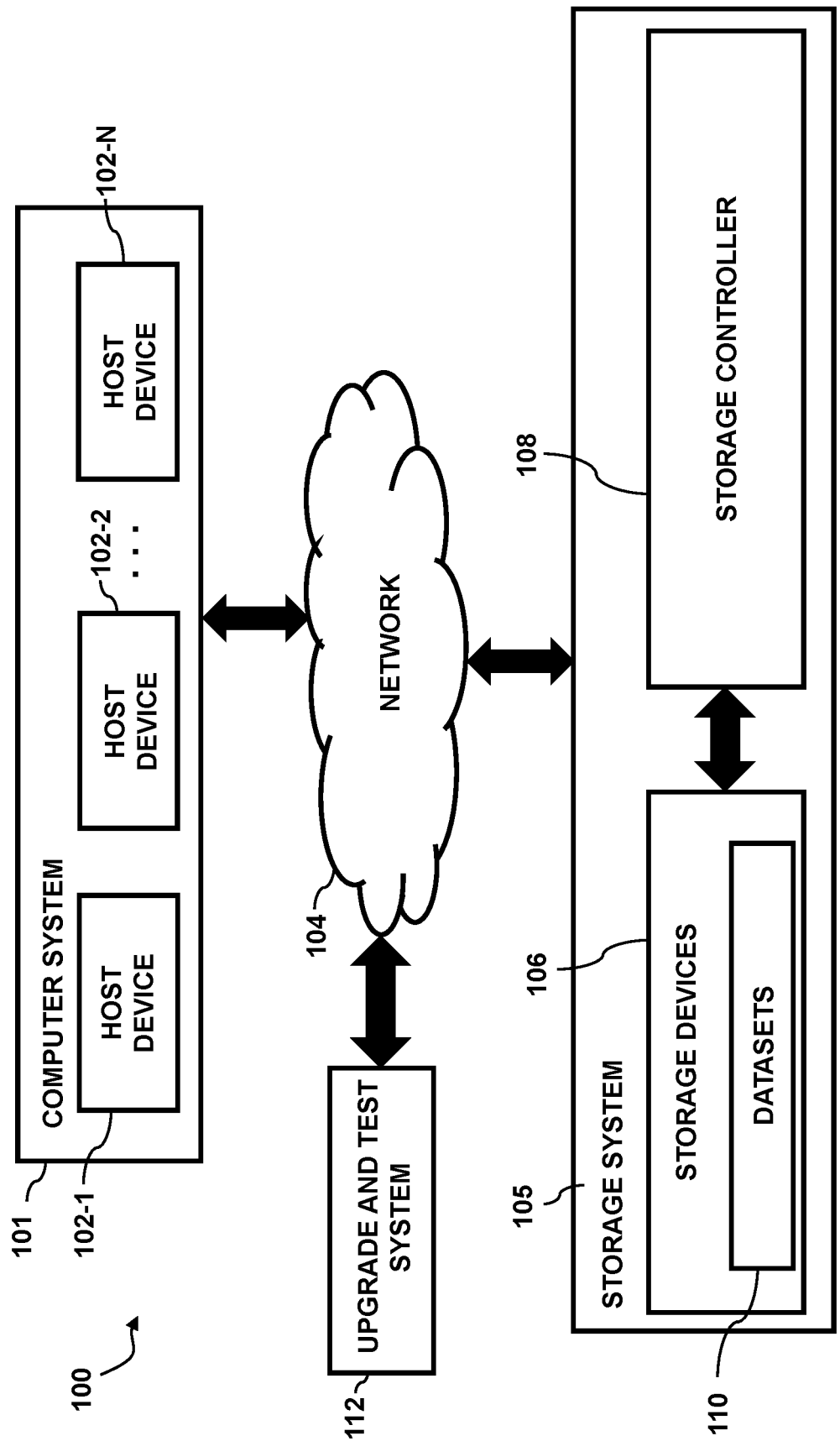
FIG. 1 is a block diagram of an information processing system comprising a storage system configured with OS upgrade functionality in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. In illustrative embodiments, the information processing system 100 comprises an upgrade and test system 112 that communicates with one or more of the host devices 102 and storage system 105.

The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102, storage system 105 and upgrade and test system 112 illustratively comprise respective processing devices of one or more processing platforms. For example, the host devices 102, storage system 105 and upgrade and test system 112 can each comprise one or more processing devices each having a processor and a memory, possibly implementing virtual hosts such as, e.g., virtual machines, containers, virtual appliances, or other virtualization infrastructure, although numerous other configurations are possible.

The host devices 102, storage system 105 and upgrade and test system 112 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store datasets 110, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array. Other types of storage arrays can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays, software-defined storage products, cloud storage products, object-based storage products and scale-out NAS clusters comprising platform nodes and associated accelerators. Combinations of multiple ones of these and other storage products can also be used in implementing a given storage system in an illustrative embodiment.

The storage system 105 should also be understood to include additional modules and other components typically found in conventional implementations of storage systems, although such additional modules and other components are omitted from the figure for clarity and simplicity of illustration.

The host devices 102, storage system 105 and upgrade and test system 112 may be implemented on respective distinct processing platforms, although numerous other arrangements are possible. For example, in some embodiments at least portions of some or all of the host devices 102, storage system 105 and upgrade and test system 112 may be implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102, storage system 105 and upgrade and test system 112 to reside in different data centers. Numerous other distributed implementations of one or more of the host devices 102, storage system 105 and upgrade and test system 112 are possible. Accordingly, the host devices 102, storage system 105 and upgrade and test system 112 can also be implemented in a distributed manner across multiple data centers.

Additional examples of processing platforms utilized to implement host devices 102, storage system 105 and upgrade and test system 112 in illustrative embodiments will be described in more detail below in conjunction with FIGS. 11 and 12.

It is to be appreciated that these and other features of illustrative embodiments are presented by way of example only and should not be construed as limiting in any way.

Accordingly, different numbers, types and arrangements of system components such as host devices 102, network 104, storage system 105, storage devices 106, storage controller 108, datasets 110 and upgrade and test system 112 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, the disclosed OS upgrade functionality can be implemented in the storage system, in one or more host devices, on the upgrade and test system or partially in a host device, partially in a storage system, partially in the upgrade and test system or any combination thereof. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

With reference now to FIG. 2-10, example systems and processes according to illustrative embodiments will now be described.

Figure 2:
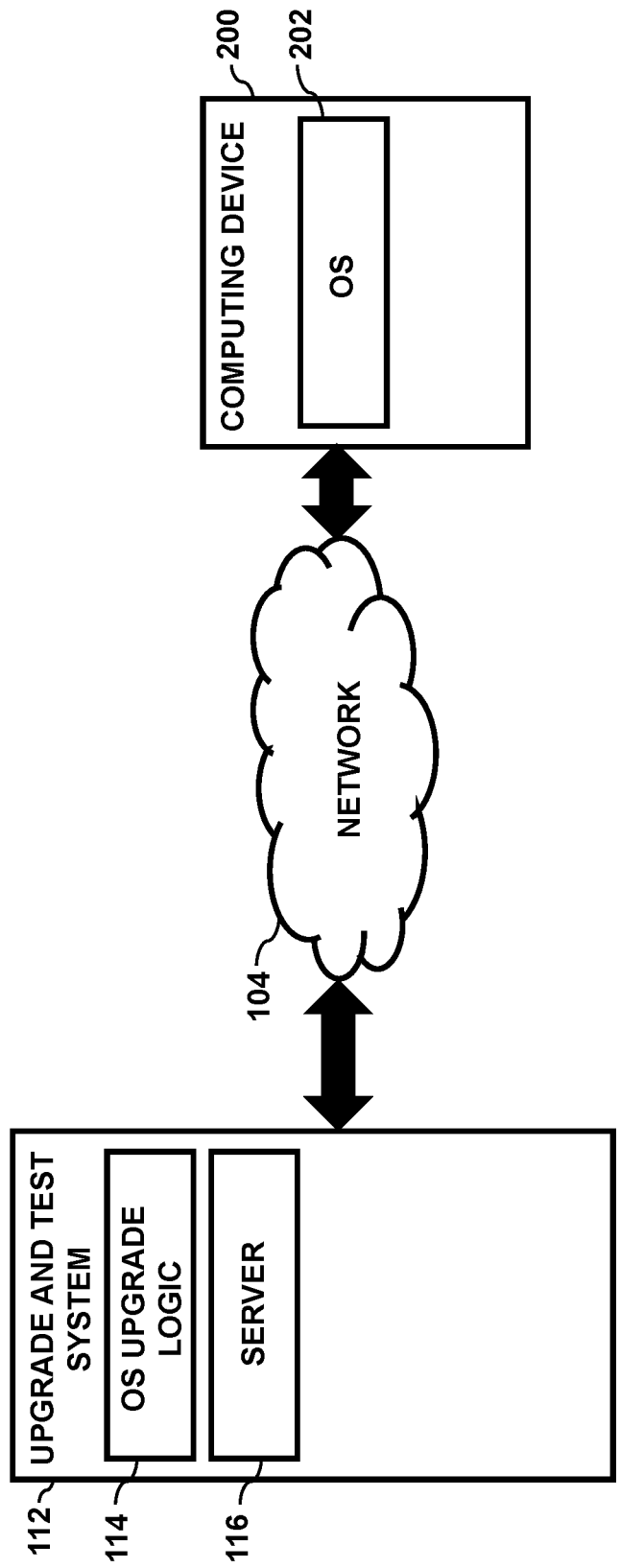
FIG. 2 is a block diagram illustrating an example configuration of the information processing system of FIG. 1 comprising a computing device in communication with an upgrade and test system in an illustrative embodiment.

As shown in FIG. 2, upgrade and test system 112 is configured to communicate with a computing device 200 via network 104 where computing device 200 represents, for example, a host device 102, a storage controller 108 or any other component of information processing system 100 that comprises an OS 202. For example, computing device 200 may comprise a production server or other production component of the information processing system 100 that is actively handling user data.

Upgrade and test system 112 comprises OS upgrade logic 114 and a server 116. Server 116 comprises one or more processing devices each having a processor and a memory, possibly implementing virtual hosts such as, e.g., virtual machines, containers, virtual appliances, or other virtualization infrastructure, although numerous other configurations are possible and is configured for testing OS configurations, e.g., through the use of VMs. In some cases, server 116 may also or alternatively be referred to as a test server 116 or non-production server 116.

A process for upgrading the OS configuration of the computing device 200 will now be described with reference to FIGS. 3-10.

Figure 3:
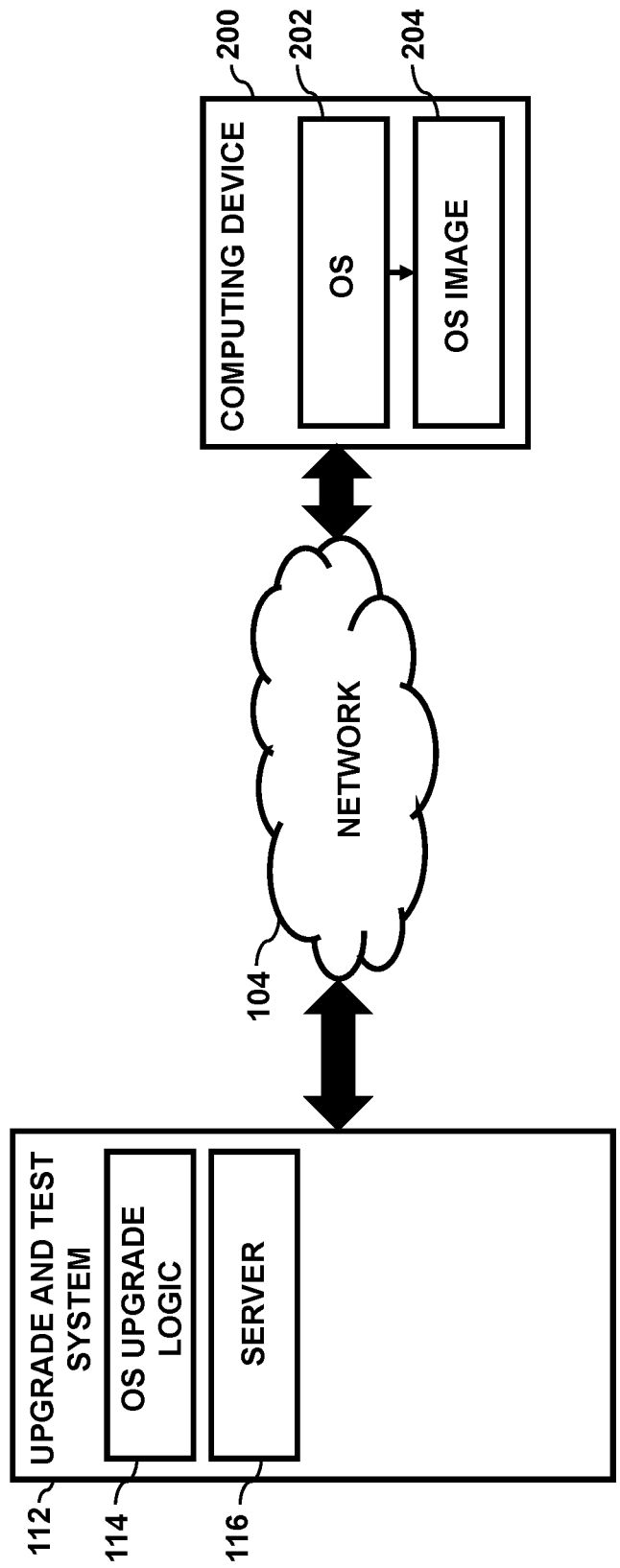
FIG. 3 is a block diagram of the example configuration of FIG. 2 illustrating the computing device generating an OS image in an illustrative embodiment.

With reference to FIG. 3, the computing device 200 generates an OS image 204 based on the configuration of the OS 202 using a bare metal recovery (BMR) backup tool, a VM disk level snapshot or in any other manner. In illustrative embodiments, the OS 202 is an OS of a physical server or an OS of a VM. For example, in the case where the computing device 200 comprises the storage controller 108, the OS image 204 of the configuration of the OS 202 of the storage controller 108 may be generated by the storage controller 108. In illustrative embodiments, the OS image 204 is an image of the OS disk of the computing device 200 where the OS image 204 does not comprise production data of an end user that may be stored or managed by the computing device 200, e.g., data stored on the storage devices 106 of FIG. 1.

Figure 4:
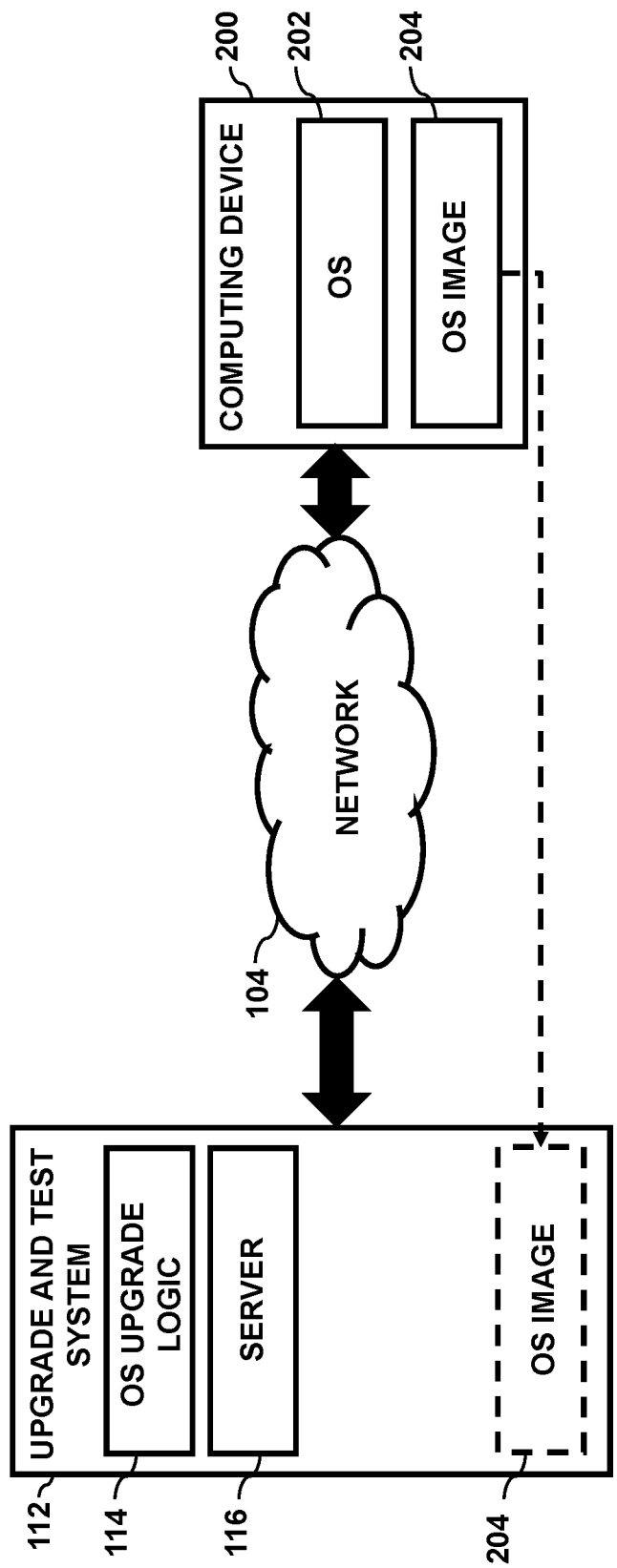
FIG. 4 is a block diagram of the example configuration of FIG. 3 illustrating the upgrade and test system obtaining the OS image from the computing device in an illustrative embodiment.

With reference to FIG. 4, the OS upgrade logic 114 obtains a copy of the OS image 204 from the computing device 200, e.g., via network 104. In some embodiments, the copy of the OS image 204 may be obtained in any other manner including, e.g., physically transferring the OS image 204 using a physical storage medium such as a universal bus controller (USB) drive, compact disc, or other similar physical storage medium. The copy of the OS image 204 may be stored in a memory of the upgrade and test system 112.

Figure 5:
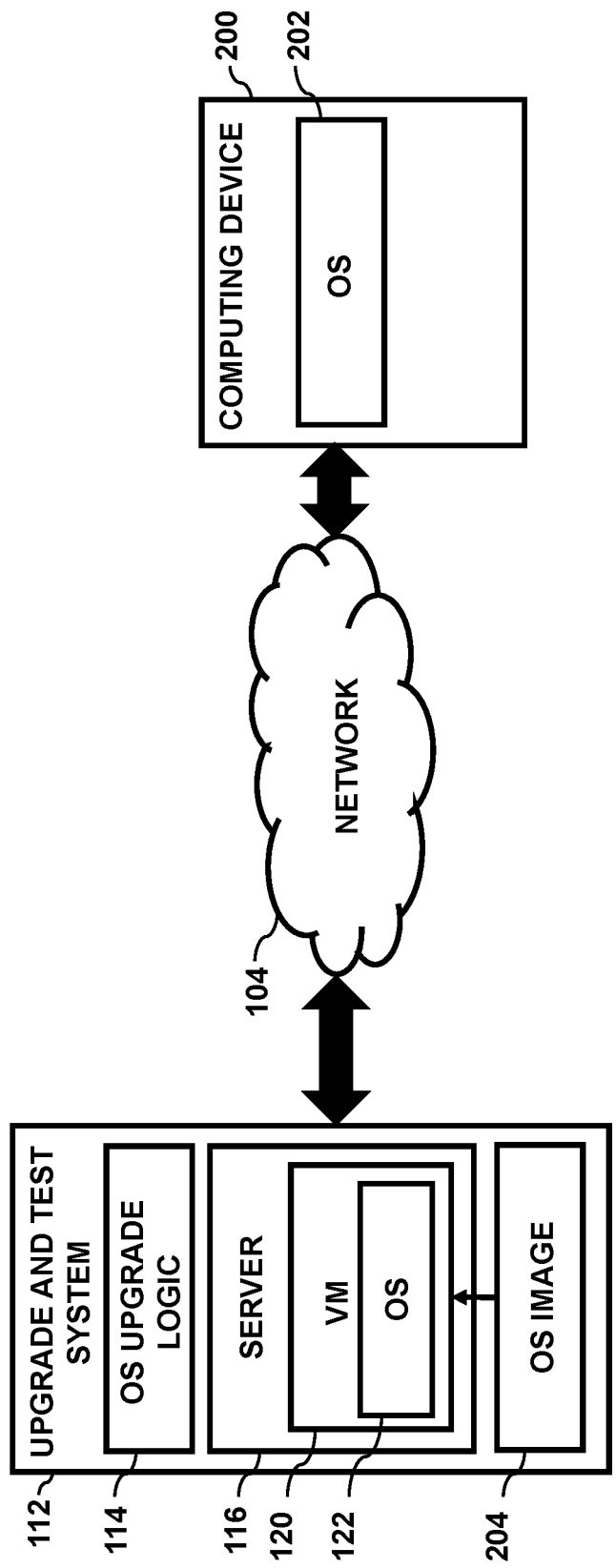
FIG. 5 is a block diagram of the example configuration of FIG. 4 illustrating the upgrade and test system generating a virtual machine having an OS on a server based at least in part on the obtained OS image in an illustrative embodiment.

With reference to FIG. 5, OS upgrade logic 114 utilizes the OS image 204 to generate a new VM 120 having an OS 122 on the server 116. In some embodiments, the configuration of OS 122 is functionally similar to or functionally the same as the configuration of OS 202.

Figure 6:
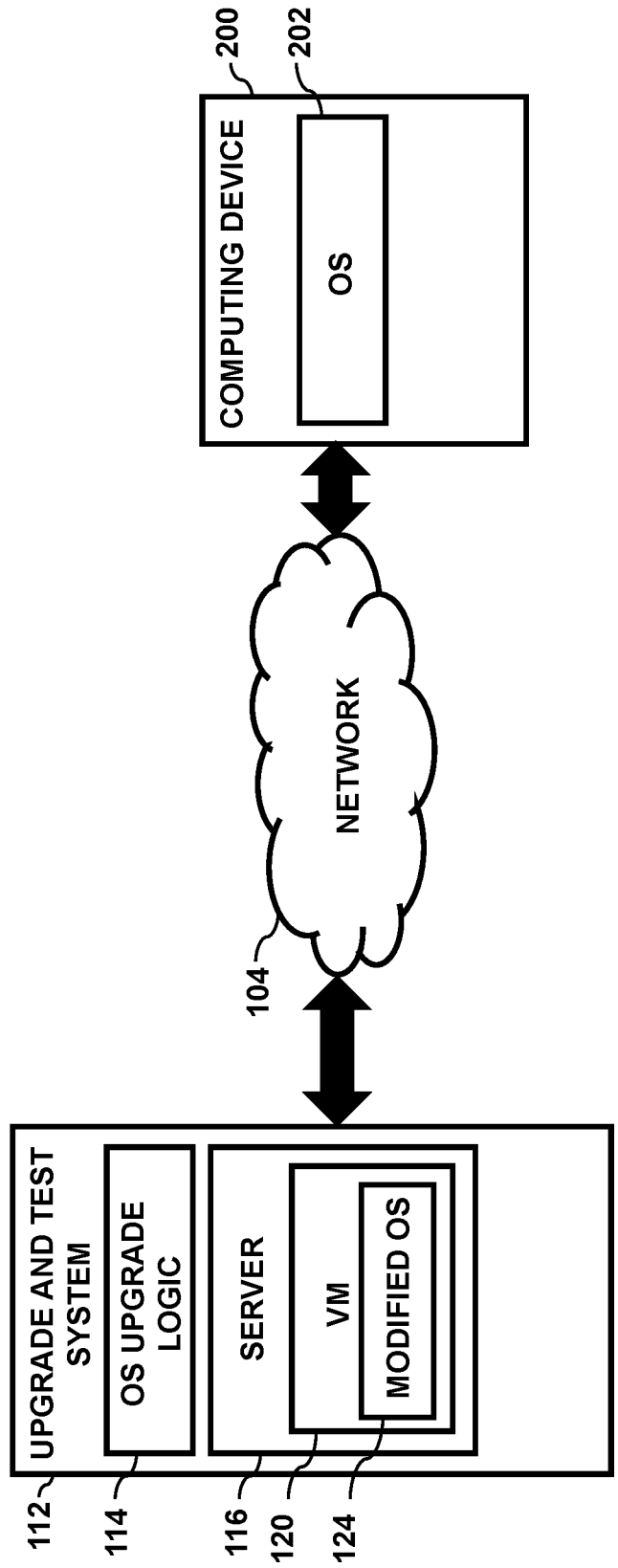
FIG. 6 is a block diagram of the example configuration of FIG. 5 illustrating the upgrade and test system modifying the OS of the virtual machine in an illustrative embodiment.

With reference to FIG. 6, the OS upgrade logic 114 utilizes the new VM 120 to perform configuration changes or modifications to the OS 122 to generate a modified OS 124. For example, OS upgrade logic 114 may modify the OS 122 by performing OS disk partition reorganization for the OS 122 such as, e.g., resizing the partitions of the OS 122, increasing or decreasing the number of partitions of the OS 122, changing a partition type of one or more of the partitions or other similar reorganization or configuration changes for the OS 122. For example, the partition type for a particular partition may be changed from a raw partition type to a Logical Volume Manager (LVM) partition type. In one example, the partition may be modified by modifying a partition table of the OS 122. In some cases, OS upgrade logic 114 may also or alternatively modify the configuration of OS 122 by upgrading or rolling back the version of the OS 122. If any other changes are needed for the configuration of OS 122, they may also be performed by OS upgrade logic 114 on the VM 120.

In an example scenario, if the boot partition is too small in the original OS 122 for the upgraded version, the size of the boot partition can be increased on the server 116 during reconfiguration such that the modified OS 124 has sufficient space in the boot partition for the upgraded version. Typically, such an action cannot be performed on the production computing device 200 during a conventional upgrade process since in order to increase the partition the OS needs to be removed and re-created which can have significant impact on the production server. By utilizing the server 116 to modify the OS, the partitions may be reconfigured as needed without impacting the production computing device 200. In some cases, the use of BMR backups may also allow OS upgrade logic 114 to divide the partitions into any sizes that are desired.

With reference again to FIGS. 5 and 6, in some cases, OS upgrade logic 114 may modify the partitions during the initial installation of the OS 122 on the VM 120 of the server 116, e.g., when the VM 120 starts up and before the OS 122 is loaded or during generation of the VM 120. For example, while the OS image 204 may comprise partition information, this partition information may be manipulated during the generation of the VM 120 and OS 122 to increase or decrease the partition sizes as needed before the OS 122 loads on the VM 120 of the server 116, e.g., by modifying the partition tables for the OS. In some cases, the existing partitions may even be removed and new partitions may be re-mapped as needed. For example, since the OS data is typically associated with a particular partition name, when the re-sized or newly generated partitions are implemented the data is assigned and mapped to the right partition automatically based on the partition name. In this example, the process of FIGS. 5 and 6 may be combined where the OS 122 that is generated is generated as a modified OS 124.

In some embodiments, the modified OS 124 may be tested and verified on the VM 120 by OS upgrade logic 114. For example, the VM 120 with the modified OS 124 may be run, restarted or have other actions performed on it as if it were a production server to verify that the changes made to the configuration of the OS 122 to generate the modified OS 124 do not cause any operational issues, crashes, failures or other issues for the modified OS 124.

Figure 7:
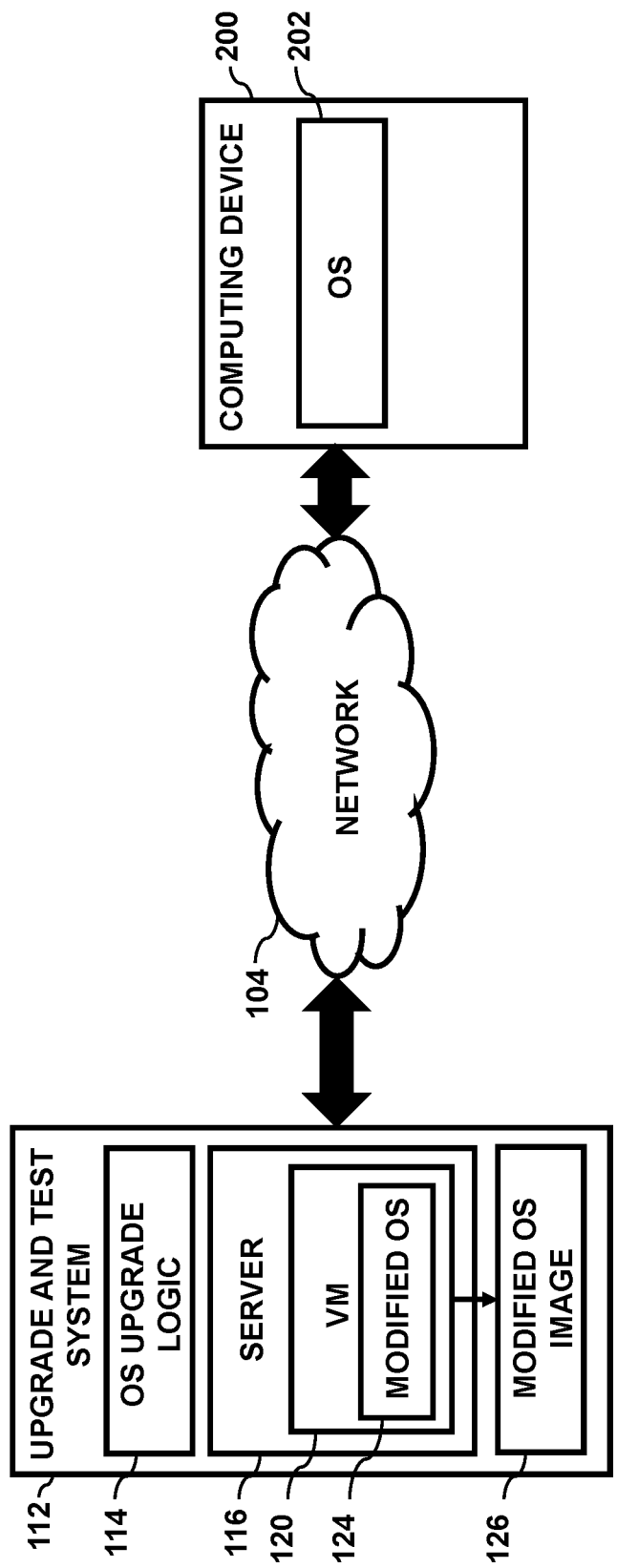
FIG. 7 is a block diagram of the example configuration of FIG. 6 illustrating the upgrade and test system generating a modified OS image-based at least in part on the modified OS of the virtual machine in an illustrative embodiment.

With reference now to FIG. 7, OS upgrade logic 114 generates a modified OS image 126 based on the modified OS 124, e.g., using a bare metal recovery (BMR) backup tool, a VM disk level snapshot or in any other manner similar to that described above for generating OS image 204. For example, the type of tool used to generate the modified OS image 126 may correspond to the type of tool used to generate OS image 204 by computing device 200. For example, in a case where the OS image 204 is a BMR backup, modified OS image 126 may also be generated as a BMR backup. In other embodiments, the type of tool used to generate the modified OS image 126 may correspond to the type of tool that will be used to replace the OS on the computing device 200. For example, while a BMR backup tool may be used by the computing device 200 to generate the OS image 204 and to generate the VM 120 and OS 122, the modified OS image 126 may be generated using a VM disk level snapshot tool which also may be used to replace the OS 202 on the computing device 200, for example, as described below.

It is important to note that to this point during the modification and upgrade process performed by OS upgrade logic 114 using upgrade and test system 112 no downtime of the production server, e.g., computing device 200, was necessary. For example, since the modification, upgrading and testing of the OS is not performed on the computing device 200 itself, no downtime of the production server is needed and the computing device 200 is free to continue servicing client input-output operations. Once the modified OS image 126 has been generated, a change window for installing the modified OS 126 on the computing device 200 may be arranged. In some cases, the change window may alternatively be arranged in advance while the modified OS 126 is being generated.

In some embodiments, the modified OS image 126 may be utilized to generate a new VM on the server 116 to verify that the modified OS image 126.

Figure 8:
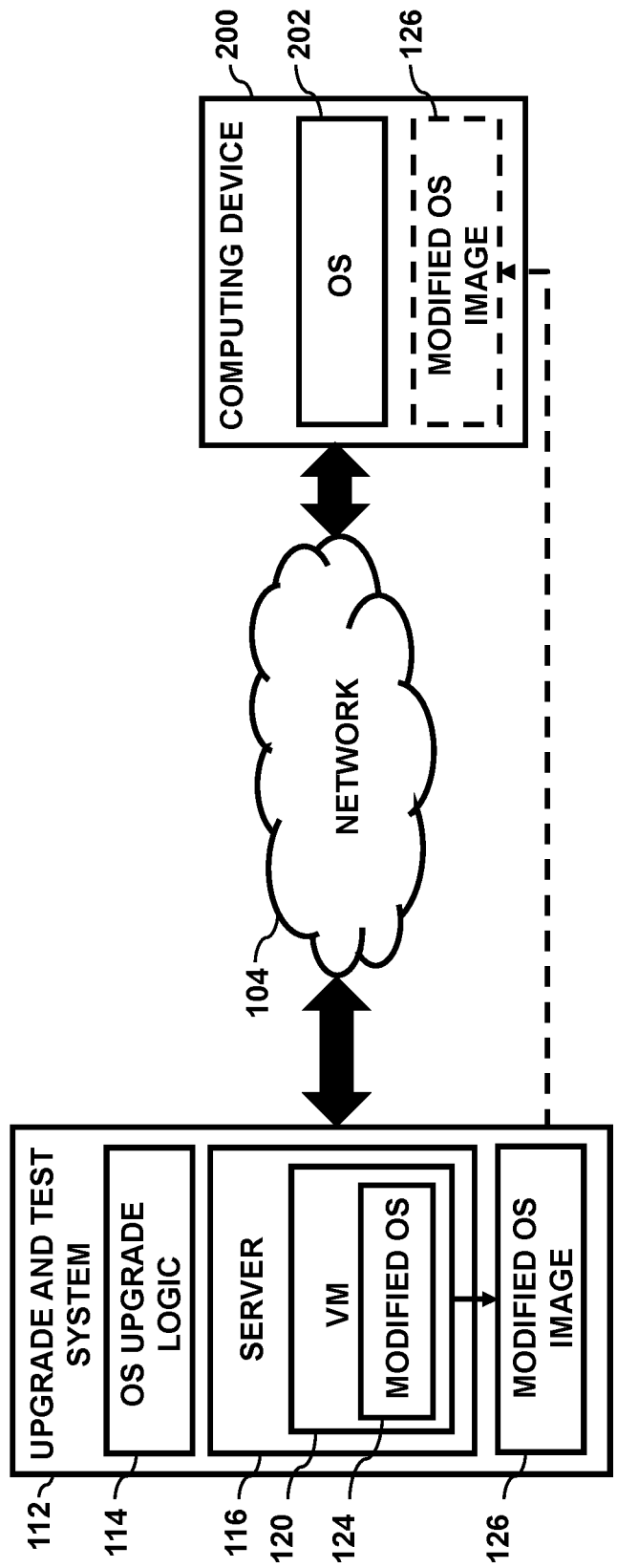
FIG. 8 is a block diagram of the example configuration of FIG. 7 illustrating the upgrade and test system providing the modified OS image to the computing device in an illustrative embodiment.

With reference now to FIG. 8, the OS upgrade logic 114 provides the modified OS image 126 to the computing device 200, e.g., via network 104 or in another manner.

Figure 9:
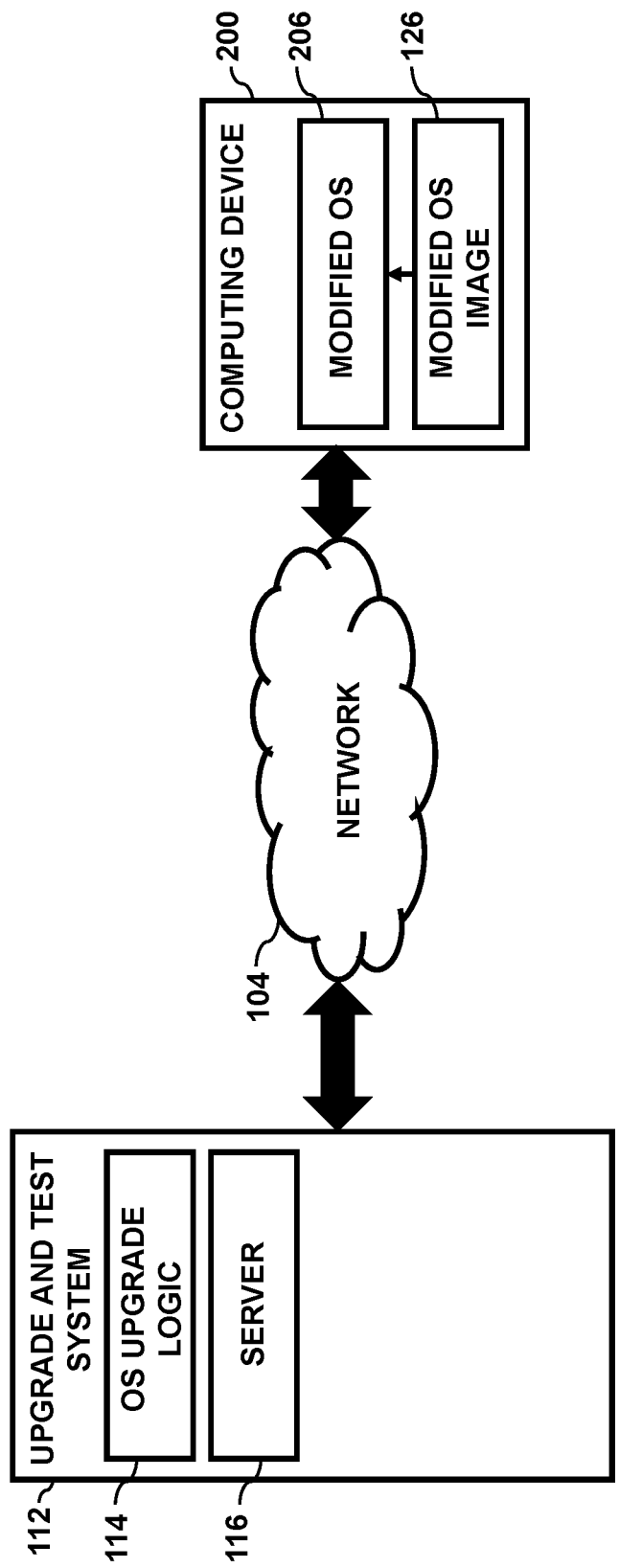
FIG. 9 is a block diagram of the example configuration of FIG. 8 illustrating the computing device replacing the OS of the computing device with the modified OS based at least in part on the provided modified OS image in an illustrative embodiment.

With reference now to FIG. 9, the computing device 200 utilizes the modified OS image 126 to replace the OS 202 with a modified OS 206. For example, in a case where the modified OS image 126 was generated as a BMR backup, the modified OS image 126 may be restored to replace the OS 202 with the modified OS 206. In another example, if a VM disk level snapshot was utilized, the modified OS image 126 may be attached to the original production computing device 200.

In either case, the restore or attachment would only need a minimal amount of downtime, e.g., 15 minutes, as opposed to the four or more hours that would be required during a traditional upgrade to alter the configuration of the production OS.

In some cases, the upgrade process may be repeated to generate modified OS images for multiple computing devices 200, e.g., servers, nodes, storage systems, or other computing devices, which may then be utilized to upgrade the computing devices 200 during the same change window to limit the amount of downtime needed for a multi-computing device system. This process may also be easily scaled as needed to handle upgrades for any number of computing devices 200 where, for example, the modified OS images may be generated in the upgrade and test system 112 in a manner that utilizes as much time as needed to ensure that the configurations are stable before applying the modified OS images to upgrade the computing devices 200. It is important to note that each computing device 200 may be provided with a modified OS image 126 that is specific to the needs of that computing device 200 where, for example, one or more of the modified OS images 126 may comprise different features or configurations. Alternatively, where the same OS configuration is utilized for multiple computing devices, the same modified OS image 126 may be provided to each of the servers for restore or attachment.

Figure 10:
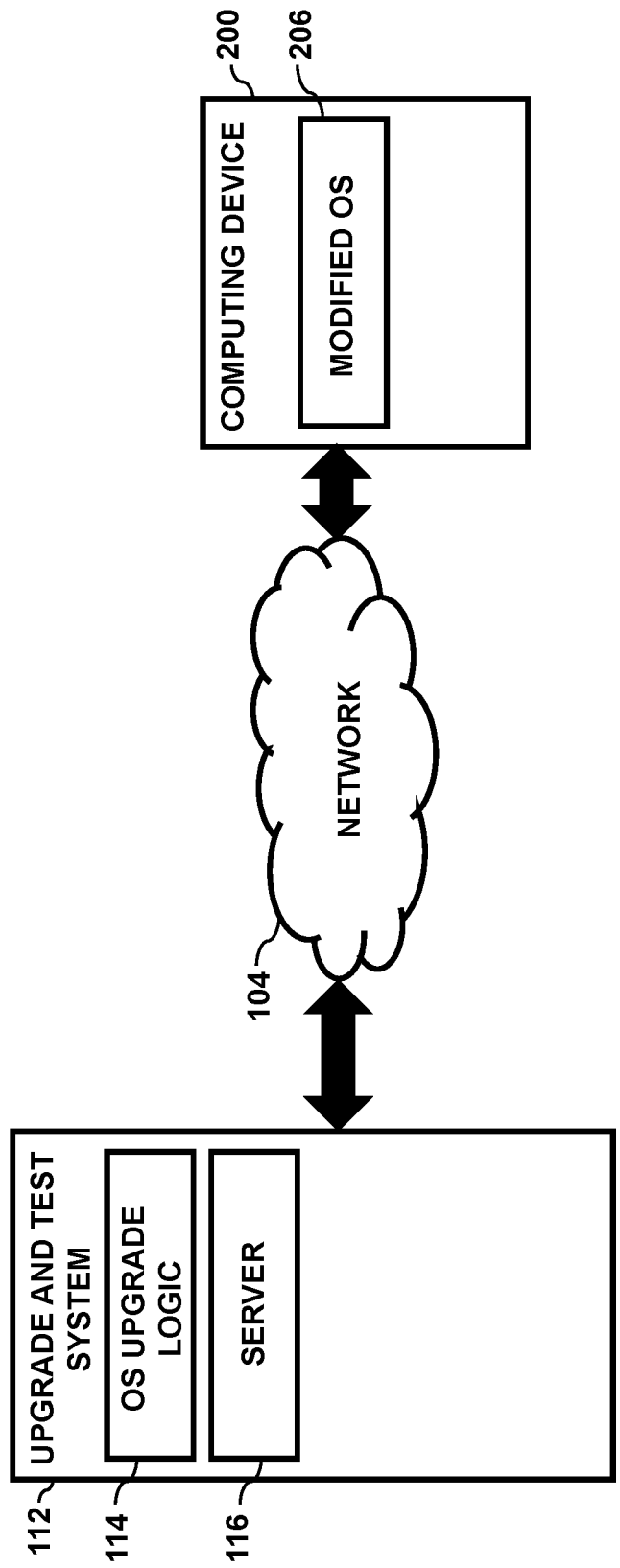
FIG. 10 is a block diagram of the example configuration of FIG. 9 illustrating the computing device with the modified OS in an illustrative embodiment.

With reference now to FIG. 10, the computing device 200 is shown having the modified OS and the upgrade process has been completed.

The disclosed OS upgrade functionality implemented by OS upgrade logic 114 may be utilized to upgrade an OS to new version or to reconfigure the OS with minimal downtime to the end user's production systems. For example, where traditional upgrade processes often require four or more hours of downtime for the production systems, the disclosed OS upgrade functionality may be utilized to significantly reduce this downtime to only a few minutes. In addition, the disclosed OS upgrade functionality may be utilized to recreate, resize or otherwise modify the OS disk partitions as needed which typically cannot be done by using traditional upgrade processes. The disclosed OS upgrade functionality may also or alternatively be utilized to modify the size of the OS as a whole including all of the partitions. Since the setup for the upgrade process according to the disclosed OS upgrade functionality may be performed separately from the end user system, the impact and downtime for the client applications is minimized while allowing additional time for validation and testing prior to the upgrade window on the end user system, which greatly reduces the potential for configuration errors as part of the upgrade process. For example, prior to the implementation of the upgrade on the end user system during the target upgrade window, the system administrators will know whether or not the upgrade will be successful based on the validation and testing. In contrast, traditional upgrade processes may only discover whether or not a potential upgrade has failed during the upgrade window after the end user system is already offline. Rolling back upgrades utilizing the disclosed OS upgrade functionality is also much faster and, for example, may take around 15 minutes whereas the traditional upgrade processes may take more time and effort to roll back the changes.

It is to be understood that for any methodologies described herein with reference to FIGS. 2-10, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102, a storage controller such as storage controller 108 or a system such as upgrade and test system 112 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device, or storage controller or server, a given such processing device may correspond to one or more virtual machines or other types of virtualization infrastructure such as Docker containers or Linux containers (LXCs). The host device 102, the storage controller 108 or upgrade and test system 112, as well as other system components, may be implemented at least in part using processing devices of such processing platforms. For example, in a distributed implementation of the host devices 102, storage controller 108 or upgrade and test system 112, respective distributed modules of such a storage controller can be implemented in respective containers running on respective ones of the processing devices of a processing platform.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices, storage systems and test systems with OS upgrade functionality will now be described in greater detail with reference to FIGS. 11 and 12. Although described in the context of system 100, these platforms may also be used to implement at least portions of other information processing systems in other embodiments.

Figure 11:
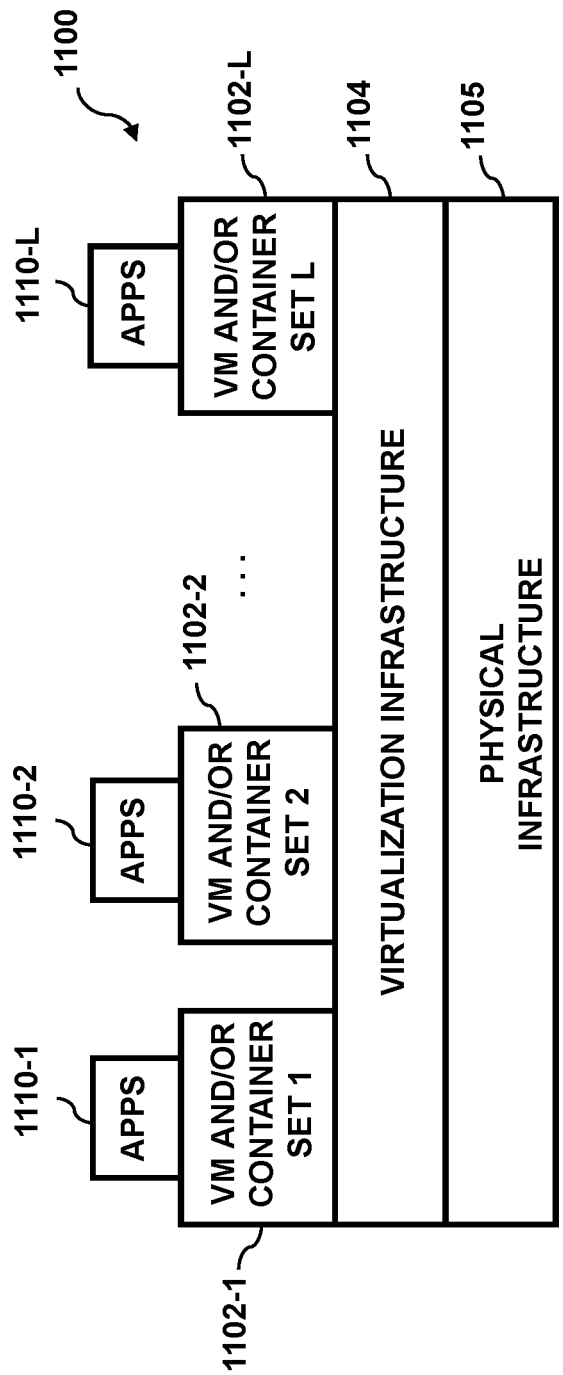
FIGS. 11 and 12 show examples of processing platforms that may be utilized to implement at least a portion of an information processing system in illustrative embodiments.
Figure 12:
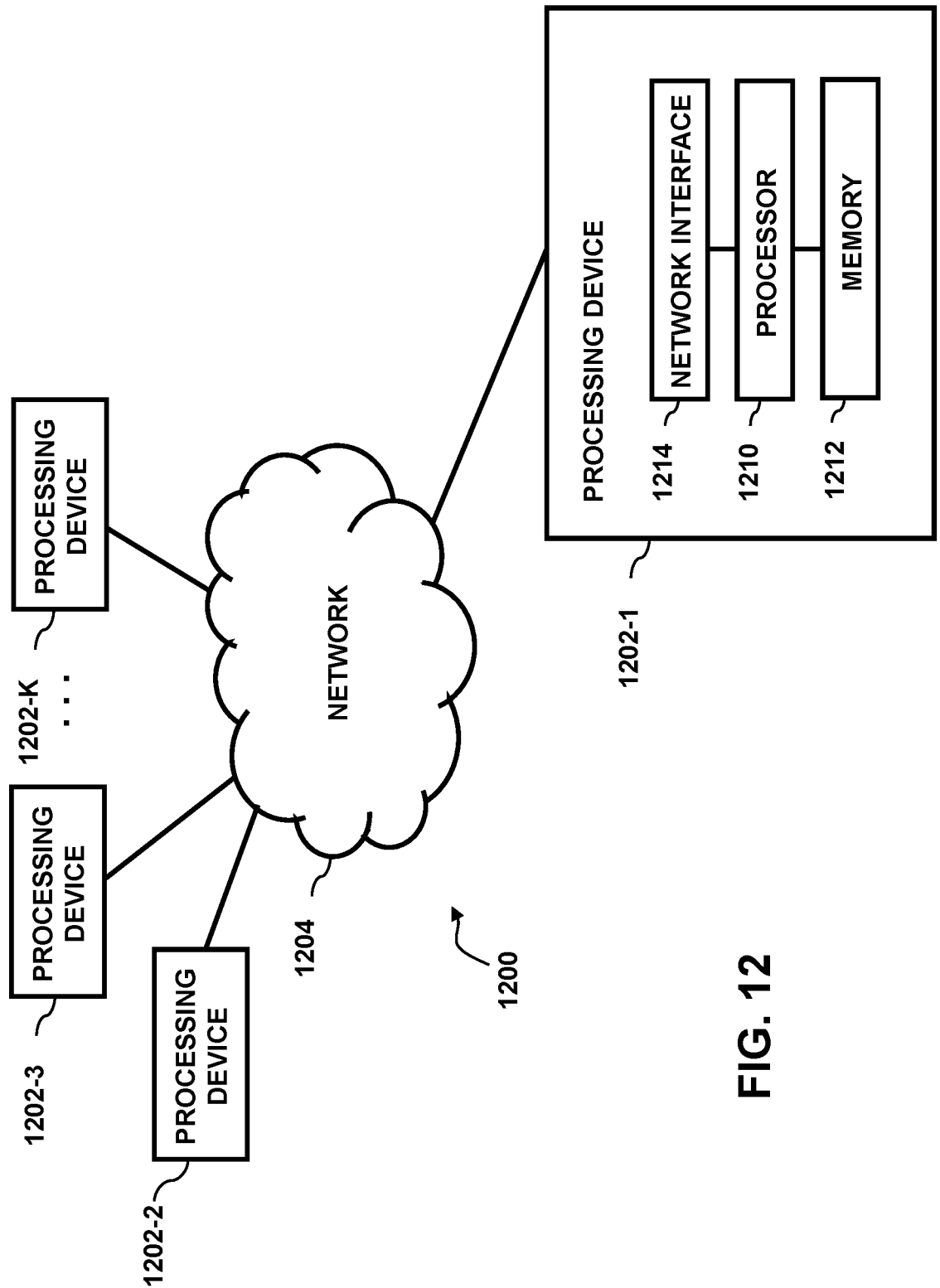

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or OS level virtualization infrastructure. The OS level virtualization infrastructure illustratively comprises kernel control groups of a Linux OS or other type of OS.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide functionality of the type described above in the illustrative embodiments for one or more processes running on a given one of the VMs. For example, each of the VMs can implement the above-described functionality of the illustrative embodiments in the system 100.

A hypervisor platform that implements a hypervisor within the virtualization infrastructure 1104 may comprise an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides OS level virtualization functionality, such as support for Docker containers running on bare metal hosts, or Docker containers running on VMs. The containers are illustratively implemented using respective kernel control groups of the OS. Such implementations can also provide functionality of the type described above in the illustrative embodiments. For example, a container host device supporting multiple containers of one or more container sets can implement one or more instances of the above-described functionality of the illustrative embodiments.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of a storage system as disclosed above in the illustrative embodiments are illustratively implemented in the form of software running on one or more processing devices.

It should again be emphasized that the above-described embodiments are presented for purposes of illustration only. Many variations and other alternative embodiments may be used.

For example, the disclosed techniques and functionality described above in the illustrative embodiments are applicable to a wide variety of other types of information processing systems, host devices, storage systems or other systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device coupled to memory, the at least one processing device being configured:
to obtain an operating system image from a computing device;
to implement a first operating system configuration on a server based at least in part on the operating system image, wherein implementing the first operating system configuration on the server comprises instantiating a first virtual machine on the server utilizing the operating system image to provide the first operating system configuration for the first virtual machine on the server;
to modify the first operating system configuration to generate a second operating system configuration for the first virtual machine on the server, the second operating system configuration for the first virtual machine comprising a modified version of the first operating system configuration for the first virtual machine;
to generate a modified operating system image based at least in part on the second operating system configuration; and
to provide the modified operating system image to the computing device;
wherein modifying the first operating system configuration comprises modifying at least one of a plurality of partitions of the first operating system configuration;
wherein modifying the at least one of the plurality of partitions comprises changing a partition type of a first one of the partitions from a first partition type to a second partition type different than the first partition type, one of the first and second partition types comprising a non-volume-based partition type and the other of the first and second partition types comprising a volume-based partition type;
wherein modifying at least one of the plurality of partitions of the first operating system configuration further comprises modifying a size of a first one of the partitions of the first operating system configuration based in part on the size of the first one of the partitions being below a designated threshold in the first operating system configuration;
wherein the server obtains the operating system image from the computing device and provides the modified operating system image to the computing device, and the server is implemented on at least one first processing device and the computing device is implemented on at least one second processing device, the at least one first processing device being separate from the at least one second processing device; and
wherein the obtaining, implementing, modifying, generating and providing are performed by the server without interrupting production operation of the computing device.

2. The apparatus of claim 1 wherein:
the computing device implements the first operating system configuration;
the operating system image is generated by the computing device based at least in part on the first operating system configuration implemented on the computing device; and
the computing device is configured to replace the first operating system configuration with the second operating system configuration on the computing device based at least in part on the modified operating system image.

3. The apparatus of claim 1 wherein the at least one first processing device is further configured to perform verification testing on the second operating system configuration on the server.

4. The apparatus of claim 3 wherein:
implementing the first operating system configuration on the server comprises generating the first virtual machine on the server based at least in part on the operating system image;
the at least one processing device is further configured to implement the second operating system configuration on the server by generating a second virtual machine on the server based at least in part on the modified operating system image; and
performing the verification testing on the second operating system configuration on the server comprises performing the verification testing on the second operating system configuration on the second virtual machine on the server.

5. The apparatus of claim 1 wherein modifying a size of the first one of the partitions of the first operating system configuration comprises modifying one or more partition tables for the first operating system configuration.

6. The apparatus of claim 1 wherein the non-volume-based partition type comprises a raw partition type and the volume-based partition type comprises a Logical Volume Manager (LVM) partition type.

7. The apparatus of claim 1 wherein modifying a size of the first one of the partitions of the first operating system configuration comprises modifying a size of a boot partition.

8. A method comprising:
obtaining an operating system image from a computing device;
implementing a first operating system configuration on a server based at least in part on the operating system image, wherein implementing the first operating system configuration on the server comprises instantiating a first virtual machine on the server utilizing the operating system image to provide the first operating system configuration for the first virtual machine on the server;
modifying the first operating system configuration to generate a second operating system configuration for the first virtual machine on the server, the second operating system configuration for the first virtual machine comprising a modified version of the first operating system configuration for the first virtual machine;
generating a modified operating system image based at least in part on the second operating system configuration; and
providing the modified operating system image to the computing device;
wherein modifying the first operating system configuration comprises modifying at least one of a plurality of partitions of the first operating system configuration;
wherein modifying the at least one of the plurality of partitions comprises changing a partition type of a first one of the partitions from a first partition type to a second partition type different than the first partition type, one of the first and second partition types comprising a non-volume-based partition type and the other of the first and second partition types comprising a volume-based partition type;
wherein modifying at least one of the plurality of partitions of the first operating system configuration further comprises modifying a size of a first one of the partitions of the first operating system configuration based in part on the size of the first one of the partitions being below a designated threshold in the first operating system configuration;
wherein the server obtains the operating system image from the computing device and provides the modified operating system image to the computing device, and the server is implemented on at least one first processing device and the computing device is implemented on at least one second processing device, the at least one first processing device being separate from the at least one second processing device;
wherein the obtaining, implementing, modifying, generating and providing are performed by the server without interrupting production operation of the computing device; and
wherein the method is implemented by at least one processing device coupled to memory.

9. The method of claim 8 wherein:
the computing device implements the first operating system configuration;
the operating system image is generated by the computing device based at least in part on the first operating system configuration implemented on the computing device; and
the computing device is configured to replace the first operating system configuration with the second operating system configuration on the computing device based at least in part on the modified operating system image.

10. The method of claim 8 wherein the at least one first processing device is further configured to perform verification testing on the second operating system configuration on the server.

11. The method of claim 10 wherein:
implementing the first operating system configuration on the server comprises generating the first virtual machine on the server based at least in part on the operating system image;
the method further comprises implementing the second operating system configuration on the server by generating a second virtual machine on the server based at least in part on the modified operating system image; and
performing the verification testing on the second operating system configuration on the server comprises performing the verification testing on the second operating system configuration on the second virtual machine on the server.

12. The method of claim 8 wherein modifying a size of the first one of the partitions of the first operating system configuration comprises modifying one or more partition tables for the first operating system configuration.

13. The method of claim 8 wherein modifying a size of the first one of the partitions of the first operating system configuration comprises modifying a size of a boot partition.

14. A computer program product comprising a non-transitory processor-readable storage medium having stored therein program code of one or more software programs, wherein the program code when executed by at least one processing device, the at least one processing device comprising a processor coupled to memory, causes the at least one processing device:
to obtain an operating system image from a computing device;
to implement a first operating system configuration on a server based at least in part on the operating system image, wherein implementing the first operating system configuration on the server comprises instantiating a first virtual machine on the server utilizing the operating system image to provide the first operating system configuration for the first virtual machine on the server;

to modify the first operating system configuration to generate a second operating system configuration for the first virtual machine on the server, the second operating system configuration for the first virtual machine comprising a modified version of the first operating system configuration for the first virtual machine;

to generate a modified operating system image based at least in part on the second operating system configuration; and to provide the modified operating system image to the computing device;

wherein modifying the first operating system configuration comprises modifying at least one of a plurality of partitions of the first operating system configuration;

wherein modifying the at least one of the plurality of partitions comprises changing a partition type of a first one of the partitions from a first partition type to a second partition type different than the first partition type, one of the first and second partition types comprising a non-volume-based partition type and the other of the first and second partition types comprising a volume-based partition type;

wherein modifying at least one of the plurality of partitions of the first operating system configuration further comprises modifying a size of a first one of the partitions of the first operating system configuration based in part on the size of the first one of the partitions being below a designated threshold in the first operating system configuration;

wherein the server obtains the operating system image from the computing device and provides the modified operating system image to the computing device, and the server is implemented on at least one first processing device and the computing device is implemented on at least one second processing device, the at least one first processing device being separate from the at least one second processing device; and wherein the obtaining, implementing, modifying, generating and providing are performed by the server without interrupting production operation of the computing device.

15. The computer program product of claim 14 wherein:
the computing device implements the first operating system configuration;
the operating system image is generated by the computing device based at least in part on the first operating system configuration implemented on the computing device; and
the computing device is configured to replace the first operating system configuration with the second operating system configuration on the computing device based at least in part on the modified operating system image.

16. The computer program product of claim 14 wherein the at least one first processing device is further configured to perform verification testing on the second operating system configuration on the server.

17. The computer program product of claim 16 wherein:
implementing the first operating system configuration on the server comprises generating the first virtual machine on the server based at least in part on the operating system image;
the program code further causes the at least one processing device to implement the second operating system configuration on the server by generating a second virtual machine on the server based at least in part on the modified operating system image; and
performing the verification testing on the second operating system configuration on the server comprises performing the verification testing on the second operating system configuration on the second virtual machine on the server.

18. The computer program product of claim 14 wherein modifying a size of the first one of the partitions of the first operating system configuration comprises modifying one or more partition tables for the first operating system configuration.

19. The computer program product of claim 14 wherein the non-volume-based partition type comprises a raw partition type and the volume-based partition type comprises a Logical Volume Manager (LVM) partition type.

20. The computer program product of claim 14 wherein modifying a size of the first one of the partitions of the first operating system configuration comprises modifying a size of a boot partition.

* * * * *